United States Patent [19]
Greenwalt

[11] Patent Number: 5,558,696
[45] Date of Patent: * Sep. 24, 1996

[54] METHOD OF DIRECT STEEL MAKING FROM LIQUID IRON

[75] Inventor: Richard B. Greenwalt, Danville, Calif.

[73] Assignee: Bechtel Group, Inc., San Francisco, Calif.

[*] Notice: The portion of the term of this patent subsequent to Aug. 16, 2011, has been disclaimed.

[21] Appl. No.: 167,268

[22] Filed: Dec. 15, 1993

[51] Int. Cl.$^6$ .................................................. C21B 13/14
[52] U.S. Cl. .......................................... 75/505; 75/548
[58] Field of Search ........................... 75/445, 446, 505, 75/548

[56] References Cited

U.S. PATENT DOCUMENTS

| | | | |
|---|---|---|---|
| 4,259,178 | 3/1981 | Wynee, Jr. et al. | 208/131 |
| 4,412,840 | 11/1983 | Goksel | 44/10 |
| 4,588,437 | 5/1986 | Kepplinger et al. | 75/43 |
| 4,600,434 | 7/1986 | Kleimeyer et al. | 75/58 |
| 4,695,318 | 9/1987 | Knauss, Jr. et al. | 75/51 |
| 4,725,308 | 2/1988 | Kepplinger | 75/26 |
| 4,744,875 | 5/1988 | Blander et al. | 204/140 |
| 4,793,855 | 12/1988 | Hauk | 75/26 |
| 4,804,408 | 2/1989 | Puhringer et al. | 75/492 |
| 4,806,158 | 2/1989 | Hirsch et al. | 75/26 |
| 4,849,015 | 7/1989 | Fassbinder et al. | 75/26 |
| 4,853,034 | 8/1989 | Quigley | 75/58 |
| 4,897,179 | 1/1990 | Mori et al. | 208/127 |
| 4,946,498 | 8/1990 | Weber | 75/26 |
| 5,259,864 | 11/1993 | Greenwalt | 75/445 |
| 5,338,336 | 8/1994 | Greenwalt | 75/445 |

FOREIGN PATENT DOCUMENTS

| | | |
|---|---|---|
| 839176 | 4/1970 | Canada. |
| 843861 | 6/1970 | Canada. |
| 1458306 | 8/1963 | Germany. |
| 2146434 | 9/1971 | Germany. |
| 6814281 | 10/1968 | Netherlands. |

OTHER PUBLICATIONS

Fleichtner, Hanns et al. "The Corex Process" *Skillings' Mining Review*, Jan. 14, 1989, pp. 20–27.

*Primary Examiner*—Melvyn Andrews
*Attorney, Agent, or Firm*—Townsend and Townsend Khourie and Crew

[57] ABSTRACT

The disclosure describes a method of direct steel making wherein liquid iron is produced in a melter gasifier system using a solid fuel reductant, preferably petroleum coke, and low silica containing iron ore, preferably less than 2.0% by weight, and the liquid iron is transferred directly to an oxygen blown steel making reactor for steel production and refining.

8 Claims, 1 Drawing Sheet

METHOD OF DIRECT STEEL MAKING FROM LIQUID IRON

BACKGROUND OF THE INVENTION

The invention relates to a method of direct steel making wherein liquid iron is produced in a melter-gasifier system using petroleum coke as the primary reductant for a high grade low silica iron ore and then the hot liquid iron is changed directly into an oxygen blown steel making reactor for steel refining and production.

U.S. Pat. No. 5,259,864 issued from copending U.S. patent application Serial No. 07/958,043 discloses a method for the disposal of an environmentally objectionable material and provision of a new and unexpectedly superior fuel source for processes utilizing melter gasifiers to make molten iron or steel preproducts. Petroleum coke makes an excellent source of carbon in processes for making molten iron or steel preproducts in which a melter gasifier unit is used. Moreover, the reaction in these processes utilizing the petroleum coke as a fuel in the melter gasifier tend to combust the petroleum coke substantially completely with reduction gas as the only gaseous product. Most residual sulfur is carried as a sulfide over with the slag formed in the melter gasifier and can be removed and disposed of or recycled with the slag. Heavy metals are carried over in stable form in solution in the molten iron or steel preproducts and will solidify therewith. A melter gasifier is used in the system and has an upper fuel charging end and a reduction gas discharging end and a lower molten metal and a slag collection end. Entry means are provided into the melter gasifier for charging ferrous material, usually in particulate form, into the melter gasifier. Petroleum coke also in particulate form is introduced into the melter gasifier at the upper fuel charging end. Oxygen-containing gas is blown into the petroleum coke in the melter gasifier to format least a first fluidized bed of coke particles formed by combustion of petroleum coke. Particulate ferrous material is introduced into the melter gasifier through the entry means. Petroleum coke, oxygen and particulate ferrous material are reacted to combust the major portion of the petroleum coke. Reduction gas and molten iron or steel preproducts are produced and a slag is formed which will contain sulfur freed by combustion of the petroleum coke. Heavy metals from the petroleum coke are carried over in stable form and go into solution in the molten iron or steel preproducts. The slag and the sulfur contained therein are removed from the melter gasifier for disposal or recycle.

U.S. Pat. No. 4,849,015 to Fassbinder et al. discloses a method for two-stage melt reduction of iron ore, in which iron ore is prereduced substantially to wustite and at the same time melted down in a melting cyclone, and then liquid hot metal is produced in an iron bath reactor connected to the outlet of the melting cyclone and receiving the melted wustite by adding carbonaceous fuels and oxidizing gas to the melt. The resulting reaction gas from the melt is afterburned, and the dust-laden, partly burned reaction gases from the iron bath reactor are accelerated and further afterburned by adding a hot blast with a temperature of 800° C. to 1500° C., and at least a portion of such accelerated, after burned reaction gases are introduced into the melting cyclone to reduce and melt fresh iron ore. Carbonaceous fuels, such as coke, carbonized lignite, petroleum coke, etc., but preferably coal of varying quality, are fed to the melt in the iron bath reactor. Slag-forming additives, such as lime, fluorspar, etc., are also fed to the iron melt to set the desired slag composition.

U.S. Pat. No. 4,806,158 to Hirsch et al. discloses a process for the production of reduced iron oxide-containing materials. Iron oxide and solid carbonaceous reducing agent are charged into a first expanded fluidized bed, which is supplied with an oxygen-containing fluidizing gas. The gas residence time selected is controlled in the reactor containing the first fluidized bed so that the reduction potential will result in a reduction of the iron oxide material not ill excess of the FeO stage. A gas-solids suspension discharged from the first fluidized bed is supplied to a second expanded fluidized bed, which is supplied with a strongly reducing fluidizing gas. Strongly reducing gas and a major portion of the resulting devolatilized carbonaceous material are discharged from the upper portion of the second fluidized bed. Reduced material having a metallization of 50 to 80% and the remaining devolatilized carbonaceous material are discharged from the lower portion of the second fluidized bed. Suitable carbonaceous materials include all coals, from anthracite to lignite, carbonaceous minerals and waste products, such as oil shale, petroleum coke or washery refuse, provided that they are solid at room temperature. The oxygen-containing gas preferably consists of oxygen or of oxygen-enriched air.

U.S. Pat. No. 4,897,179 to Mori et al. provides a method of producing reduced iron and light oil from iron ore and heavy oil which comprises a thermal cracking step of subjecting heavy oil to thermal cracking while retaining iron ore particles in a fluidized state to produce light oil and simultaneously to deposit coke as by-product on the surface of the iron ore particles; a gasification step of putting the coke-deposited ore in contact with an oxidizing gas including steam and oxygen in a fluidized state to react the coke with the gas thereby to produce a reducing gas containing hydrogen and carbon monoxide and of heating the coke-deposited ore upward of a reduction temperature of iron ore by partial oxidation of the coke; and a reduction step of reducing the coke-deposited iron ore in a fluidized state by the reducing gas to produce reduced iron. When the gasification step is performed by an oxidizing gas containing a majority of steam and up to 15 vol. %, based on the steam, of oxygen at 800°– 1000° C. under a pressure of 0–10 kg/cm$^2$G, a reducing gas containing high-concentration hydrogen gas is obtained.

Slags of high sulfur capacity have been utilized in applications associated with ferrous metallurgy. Kleimeyer et al. in U.S. Pat. No. 4,600,434 describe the use of high sulfur capacity slag and magnesium metal to desulfurize molten iron while it is contained in a torpedo car. Quigley, U.S. Pat. No. 4,853,034, describes using a vanadium-bearing, high-magnesia synthetic calcium aluminate slag for absorbing sulfur during ladle refining of steel. Knauss et al., U.S. Pat. No. 4,695,318, describe using a synthetic slag similar to that of U.S. Pat. No. 4,853,034, and the refractory brick of the ladle itself, to desulfurize molten iron contained in said ladle.

In recent years methods utilizing a melter gasifier have been developed to produce molten iron or steel preproducts and reduction gas. Most of these processes utilize a coal, fluidized-bed. A high temperature is produced in the melter gasifier utilizing coal and blown in oxygen to produce a fluidized bed and iron sponge particles are added from above to react in the bed to produce the molten iron.

A melter gasifier is an advantageous method for producing molten iron or steel preproducts and reduction gas as described in U.S. Pat. No. 4,588,437. Thus there is disclosed a method and a melter gasifier for producing molten iron or steel preproducts and reduction gas. A first fluidized-bed zone is formed by coke particles, with a heavy motion of the particles, above a first blow-in plane by the addition of coal and by blowing in oven-containing gas. Iron sponge particles and/or pre-reduced iron ore particles with a substantial portion of particle sizes of more than 3 mm are added to the first fluidized-bed zone from above. A melter gasifier for carrying out the method is formed by a refractorily lined vessel having openings for the addition of coal and ferrous material, openings for the emergence of the reduction gases produced, and openings for tapping the metal melt and the slag. Pipes or nozzles for injection of gases including oxygen enter into the melter gasifier above the slag level at least two different heights.

Another process utilizing a melter gasifier is described in U.S. Pat. No. 4,725,308. Thus there is disclosed a process for the production of molten iron or of steel preproducts from particulate ferrous material as well as for the production of reduction gas in the melter gasifier. A fluidized-bed zone is formed by coke particles upon the addition of coal and by blowing in oxygen-containing gas by nozzle pipes penetrating the wall of the melter gasifier. The ferrous material to be reduced is introduced into the fluidized bed. In order to be able to produce molten iron and liquid steel preproducts in a direct reduction process with a lower sulfur content, the ferrous material to be reduced is supplied closely above the blow-in gas nozzle plane producing the fluidized bed. An arrangement for carrying out the process includes a melter gasifier in which charging pipes penetrating its wall are provided in the region of the fluidized-bed zone closely above the plane formed by the nozzle pipes. The ferrous material to be melted as well as the dusts separated from the reduction gas and, if desired, fluxes containing calcium oxide, magnesium oxide, calcium carbonate and/or magnesium carbonate are introduced therethrough.

U.S. Pat. No. 4,793,855 to Rolf Hauk discloses process for the gasification of sewage sludge or other carbon-containing waste materials in a gasifier. A solid fuel and oxygen-containing gas are also fed into the gasifier. The solid fuel may be coal or petroleum coke. The residues formed during gasification collect at the bottom of the gasifier in the form of molten slag. Gasification takes place in a fluidized bed formed above the slag bath and constituted by the dried sewage sludge or waste materials, the solid fuel, the oxygen-containing gas and the gasification gas. The gas produced in the gasifier can be used for power generation or as a reducing gas for iron ore. Sponge iron can simultaneously be melted in the gasifier and reduced to pig iron.

There is also a process that utilizes a combined reduction furnace and melter gasifier known as the COREX® process (COREX® is a trademark of Deutsche Voest-Alpine Industrieanlagenbau GMBH and Voest-Alpine Industrieanlagenbau). This process is described in *Skilling's Mining Review*, Jan. 14, 1989 on pages 20–27. In the COREX® process the metallurgical work is carried out in two process reactors: the reduction furnace and the melter gasifier. Using non-coking coals and iron bearing materials such as lump ore, pellets or sinter, hot metal is produced with blast furnace quality. Passing through a pressure lock system, coal enters the dome of the melter gasifier where destructive distillation of the coal takes place at temperatures in the range of 1,100°–1,150° C. Oxygen blown into the melter gasifier produces a coke bed from the introduced coal and results in a reduction gas consisting of 95% $CO+H_2$ and approximately 2% $CO_2$. This gas exits the melter gasifier and is dedusted and cooled to the desired reduction temperature between 800° and 850° C. The gas is then used to reduce lump ores, pellets or sinter in the reduction furnace to sponge iron having an average degree of metalization above 90%. The sponge iron is extracted from the reduction furnace using a specially designed screw conveyor and drops into the melter gasifier where it melts to the hot metal. As in the blast furnace, limestone adjusts the basicity of the slag to ensure sulfur removal from the hot metal. Depending on the iron ores used, $SiO_2$ may also be charged into the system to adjust the chemical composition and viscosity of the slag. Tapping procedure and temperature as well as the hot metal composition are otherwise substantially the same as in a blast furnace. The top gas of the reduction furnace has a net calorific value of about 7,000 to 8,000 $KJ/Nm^3$ and can be used for a wide variety of purposes.

The fuels used in these processes are typically described as a wide variety of coals and are not limited to a small range of coking coal. The above-noted article from *Skilling'S Mining Review* notes that petroleum coke suits the requirements of the COREX® process. Brown coal and steam coal which are relatively poor quality coal having a relatively high ash content. i.e. plus 15%, have been identified as suitable for use in these processes. Coke made from coal has also been identified as a fuel for many of the processes utilizing melter gasifiers.

U.S. Pat. No. 4,946,498 to Ralph Weber shows a steel making vessel of an energy optimising furnace ("EOF") which is also described in the journal MBM-Metal Bulletin Monthly, October 1986, on pages 47 to 51, and is used for melting the iron sponge particles and into which oxygen is injected. Arranged above the melting vessel is a charging material preheater. The melting vessel accommodates a molten iron bath. Beneath the surface of the molten iron bath, under-bath nozzles open into the melting vessel for the injection of oxygen and possibly solid materials such as pulverized coal or additives, by means of a carrier gas. Above the level of the bath, further nozzles open into the melting vessel for the injection of oxygen or pre-heated air which can be supplied by way of a ring conduit and which serves for post-combustion of the CO-bearing waste gas which rises out of the molten bath. The installation also has oil-oxygen burners. The melting vessel can also be supplied with scrap which as been pre-heated by the hot waste gases from the melting vessel, in a scrap preheater which is fitted onto the melting vessel.

This application is related to U.S. patent application Ser. No. 07/958,043 filed Oct. 6, 1992, now U.S. Pat. No. 5,259,864; U.S. patent application Ser. No. 07/991,914, filed Dec. 17, 1992, U.S. patent application Ser. No. 08/056,341, filed Apr. 30, 1993 and U.S. patent application Ser. No. 08/084,888 filed Jun. 30, 1993. The disclosures of these applications are incorporated herein for all purposes.

SUMMARY OF THE INVENTION

The present invention relates to a method of direct steel making wherein liquid iron is produced in a melter-gasifier system using petroleum coke as reductant for a high grade low silica-containing iron ore and the hot liquid iron is charged directly into an oxygen blown steel making reactor for steel refining and production.

Primary liquid iron production is accomplished in a reduction furnace and melter-gasifier using high grade iron ore, limestone, petroleum coke as a reductant and oxygen. A liquid iron is produced containing at least about 5% carbon. The liquid iron is then transferred continuously and directly to an adjacent steel making reactor, The direct steel making method is especially suited to use of petroleum coke for solid fuel reductant in the reduction furnace, Petroleum coke used in combination with low silica iron ore enables desulfurizing of the liquid iron by lime addition only inside the melter-gasifier, This is a principal benefit of using petroleum coke and an iron ore having a silica content preferably less than 2.0%, The silica content can advantageously be as low as about 0.5% or less, This permits removal of a basic sulfide slag at the transfer between the gasifier and the steel making reactor thereby reducing substantially the amount of slag in the steel making process. A dam in the liquid iron transfer continuously removes the calcium sulfide as a liquid slag for sale or disposal.

The steel making reactor then receives the liquid iron, Direct reduced iron (hot or cold) and preheated scrap may be also added to the steel making reactor, Oxygen is supplied to the reactor at the molten iron bath bottom or sides below the molten metal level and at the top and sides above the slag level which will primarily combust the silicon and carbon contained in solution in the liquid iron thus converting the iron to steel, Secondary oxygen supplied above the molten bath will complete the combustion of the carbon monoxide in the upper section of the reactor and in the offgas flue. The offgas flue can be adapted to serve as a scrap preheater, Liquid steel is tapped periodically from the bottom of the steel making reactor to a ladle and then transferred to a ladle station for refining, additives and temperature control prior to casting. The refined molten steel can be continuously cast into slabs or billets for subsequent processing. The steel making reactor is preferably rotated or tilted slightly to periodically remove the small amount of slag produced during the steel making operation. The steel making slag will be discharged to a collection ladle for disposal or recycle.

A separate secondary direct reduction or power generation facility can be provided as options for application of the export reducing or flue gas. Export reducing gas from the reduction furnace is subjected to $CO_2$ removal and preheated for the secondary reduction furnace which produces cold or hot direct reduced iron for conveying (cold iron) or bucket transfer (hot iron) to the steel making reactor. In the event the export gas power option is desired, the flue gas is supplied to a steam plant or to a cogeneration power facility. For cogeneration the flue gas is compressed and combusted in a gas turbine turbogenerator with the hot turbine offgases discharged to a heat recovery steam generator for high efficiency power production.

When coal which forms a substantial quantity of ash as opposed to petroleum coke is used, a separate desulfurizing vessel is required after the calcium silicate is removed for calcium carbide and lime injection desulfurizing and secondary slag skimming. This vessel may be tilting for desulfurizing slag removal and eccentric bottom tapping for transfer of sulfur free liquid iron to the steel making reactor.

The offgas flue above the steel making reactor will be equipped with a shaft to continuously charge preheated particulate scrap at a rate controlled by water cooled feeders to the molten bath. The scrap is preheated by the heat of secondary combustion of the steel making reactor offgases. In addition particulate direct reduced iron may be introduced into the top and sides of the reactor with controlled rate feeders.

The present invention provides a method for making steel using a melter gasifier and is particularly adapted to using a combination primary reduction furnace and melter gasifier. The melter gasifier has a ferrous material charging entry, a fuel charging entry, an oxygen entry, a lower molten metal and slag collection end and a reduction gas discharging port. Petroleum coke is introduced into the melter gasifier through the fuel charging entry and oxygen is blown into the melter gasifier through the oxygen entry. Petroleum coke is combusted in the melter gasifier to form at least a first fluidized bed of coke particles from the petroleum coke and to form a hot reduction gas. The hot reduction gas is directed to a primary direct reduction furnace connected above the melter-gasifier and contacted with iron ore and limestone in the reduction furnace to produce direct reduced metallic iron and calcined limestone. The direct reduced metallic iron and the calcined limestone are introduced into the melter gasifier. The petroleum coke, oxygen, the direct reduced metallic iron and the calcined limestone are reacted at a temperature of at least 1050° C. in the melter gasifier to produce reduction gas and molten iron containing heavy metals freed from the combustion of the petroleum coke and a relatively small amount of calcium sulfide slag containing sulfur freed from the combustion of petroleum coke. The calcium sulfide slag is separated by gravity from the liquid iron in the melter gasifier and is removed from the liquid iron at the transfer from the melter gasifier. The reduction gas is also removed from the melter gasifier and a portion of the reduction gas is flowed to the primary reduction furnace. Another portion of the reduction gas may be flowed to a secondary reduction furnace. The second portion of reduction gas is combined with iron ore in the secondary direct reduction furnace to produce secondary direct reduced metallic iron. Export gas from the primary reduction furnace may be flowed to a secondary reduction furnace after $CO_2$ removal and preheating.

A steel making reactor is provided and oxygen converter is to be arranged with water cooled roof and upper side wall and preheater gas flue with a shaft for scrap, pig iron or hot briquetted direct reduced iron. Charge materials such as direct reduced iron, oxide pellets, lump ore and lime will be directly charged to the converter vessel. Vessel will have a shallow refractory lined hearth for side blowing of oxygen directly into the molten metal bath with multiple oxygen tuyeres. Oxygen burners will be located in the side walls above the molten bath to assist scrap meltdown and to combust CO driven off the molten metal. Vessel will be equipped for eccentric bottom tapping to avoid slag contamination of the molten steel. Molten iron from the melter gasifier and secondary reduced metallic iron from the secondary reduction furnace if any are introduced into a steel making reactor. Oxygen is blown into the steel making reactor and reacted with molten iron and secondary reduced metallic iron to form steel, off gas, and a steel making slag in the steel making reactor. The steel and steel making slag separate by gravity and are separately drawn from said steel making reactor.

OBJECT OF THE INVENTION

It is a particular object of the present invention to provide a process for direct steel making wherein liquid iron produced in a melter gasifier is charged directly into a steel making reactor for steel refining and production. Other objects and advantages of the present invention will be apparent from the following detailed description read in view of the accompanying drawings which are made a part of this specification.

DESCRIPTION OF THE PREFERRED EMBODIMENT

Figure 1:
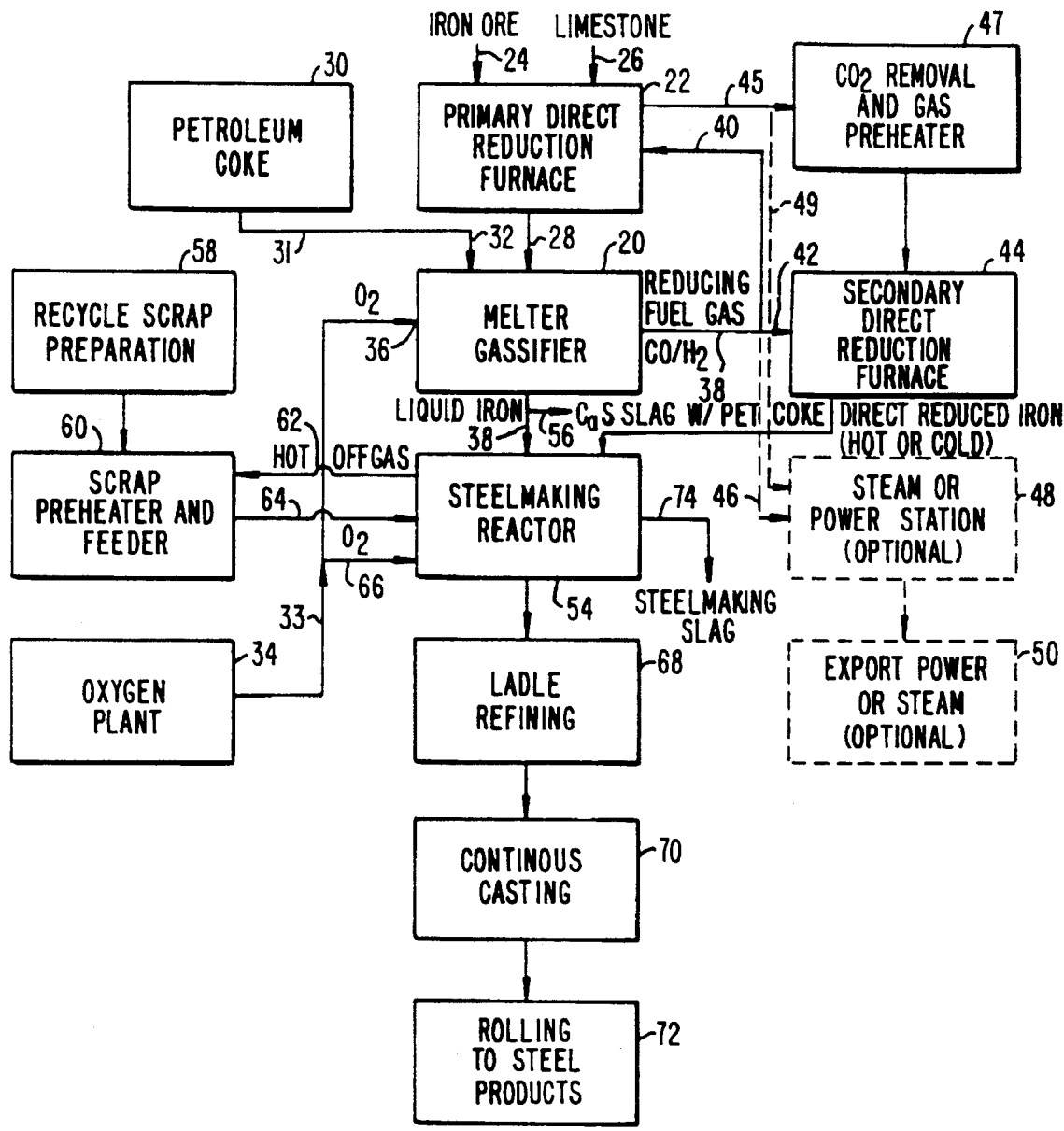
FIG. 1 is a flow diagram illustrating apparatus assembled in accordance with the present invention.

The invention is predicated on the recognition that liquid iron made by combustion of petroleum coke can advantageously be directly converted to steel in a low slag process. In most such applications petroleum coke will be the superior reduction fuel as opposed to coal for reasons more fully set out herein. As shown in FIG. 1, a melter gasifier 20 is directly connected to a primary reduction furnace 22. In preferred form the reduction furnace and melter-gasifier used are of the type shown in U.S. Pat. No. 5,259,864. Reduced iron ore is charged into the melter gasifier 20 from the reduction furnace 22. The reduction furnace is charged with iron ore from source 24 and limestone from source 26 to provide the reduced ferrous material for use in the melter gasifier. The melter gasifier is provided with an entry 28 for charging such ferrous material and calcined limestone preferably at the upper end thereof. The iron ore should be of high quality and should have a silica and alumina content of preferably less than 2.0% to reduce the amount of slag subsequently formed in the melter gasifier and advantageously as low as or less than 0.5%.

Petroleum coke from a suitable source 30 is charged into the melter gasifier through conduit 31 to a fuel charging entry 32. The petroleum coke may be charged through a pressurized lock hopper (not shown) in a manner well known to those skilled in the art. Oxygen containing gas is blown into the melter gasifier 20 through conduit 33 to an oxygen entry 36 from a suitable source of oxygen 34. The oxygen and petroleum coke are combusted to form at least a first fluidized bed of coke particles from the petroleum coke in the melter gasifier. Petroleum coke, oxygen and the ferrous material are reacted in the melter gasifier to combust the major portion of the petroleum coke to produce reduction gas and hot liquid iron containing heavy metals freed from the combustion of the petroleum coke. The reduction gas is flowed out of the melter gasifier 20 through conduit 38. The reduction gas may be directed to the primary reduction furnace 22 via conduit 40 where it is used to reduce iron ore or a portion of the reduction gas may be directed to a secondary reduction furnace 44 via conduit 42 for reduction purposes or to conduit 49 for power or steam generating system 48. Export gas from the primary reduction furnace 22 may be flowed via conduit 45 to a secondary reduction furnace 44 after a $CO_2$ removal and preheating or indicated by block 47. This stripped export gas is combined with iron ore in the secondary direct reduction furnace 44 to produce secondary direct reduced iron.

Petroleum coke is an ideal fuel for melter gasifier ironmaking as it is high in carbon and has no ash content. It provides a high adiabatic flame temperature which is advantageous for maintaining the melter-gasifier dome temperatures for cracking tar and hydrocarbons. Furthermore, the use of petroleum coke in processes such as the COREX® process provides the manufacture of a superior reducing gas for direct reduction having a high proportion of contained carbon monoxide reducing gas.

When a melter gasifier such as used in U.S. Pat. No. 5,259,864 wherein the process is operated with petroleum coke the carbon content of the fuel is 97% carbon and 3% hydrogen (10% hydrocarbons). As a result, a superior CO level of above 70% and up to 85% is reached in reducing gases prepared from petroleum coke. The high CO level ensures that clustering is not experienced in the reduction furnace. In addition, the reduction furnace is operated at a process gas temperature of 850° C., a 100° C. higher processing temperature than the normal natural gas based reduction furnaces. The high CO reducing gases from the petroleum coke allow higher process gas temperatures during reduction which contribute to increased productivity and improved direct reduced iron quality and stability.

Petroleum coke provides an improved high carbon monoxide level reducing gas which prevents sintering and clustering of the reduced metallic iron, High CO level reducing gases have a two-fold advantage which minimizes clustering, (1) the low $H_2$ gas content minimizes the occurrence of catastrophic metallic iron recrystallization promoting cluster formation during reduction and (2) the CO reducing gas has a tendency to form a carbon layer and $Fe_3C$ coating by inversion at the surface of the reduced metallic iron particles acting as a lubricant and preventing sintering of the iron particles.

The use of petroleum coke provides a reduced iron product with increased level of carburization which is highly advantageous as an energy source for subsequent iron and steel making processes. The high CO reducing gases from combustion of petroleum coke increase the level of carburization of the metallic iron in the reduction furnace. Reduced iron pellets from the reduction furnace had a carbon content of 3.5% as $Fe_3C$, and the porous reduced laminated iron ore and sinter from the reduction furnace had a carbon content of 1.5% as $Fe_3C$ plus 3.0 to 3.5% of carbon contained in the pores for a product carbon content ranging from 3.5 to 5.0%.

The high level of contained carbon in the reduced iron from the reduction furnace is extremely advantageous for downstream iron and steel making processes as the carburized iron forms its own energy source. The use of petroleum coke in the process with the resultant high carbon monoxide reducing gases increases the carbon content of the direct reduced iron to above 5.0 to 6.0% and even to 6.5%. The contained carbon in the direct reduced iron is an energy source which is beneficial to ironmaking and to steel making whether in an electric arc furnace, an oxygen converter or an energy optimizing furnace. This is especially true in the electric arc furnace and the energy optimizing furnace since the contained carbon permits formation of a favorable foamy slag practice during steel making. The primary slag formation in the electric arc furnace and the energy optimizing furnace enables significant phosphorus removal from the metal by taking a slag removal early in the heat. The use of petroleum coke as a fuel in the process is also advantageous in that recycle and use of $CO_2$ as a cooling gas with petroleum coke for the high temperature control of the melter gasifier dome temperatures is made possible. Low pressure six bar steam can be injected through the tuyeres to control the melter gasifier temperatures and maintain a dome temperature of 1100° C. or less. Steam, however, increases the hydrogen level of the gasifier reducing gases.

When using high adiabatic flame temperature petroleum coke and oxygen in accordance with the present invention, flame temperatures are 900° C. higher than with coal as used before the present invention and a cooling gas must be supplied for temperature control. In accordance with the present invention, dome temperatures are controlled by injecting six bar $CO_2$ at the tuyeres. With 20% injection of $CO_2$ at the tuyeres, the dome temperature is maintained at 1100° C. The $CO_2$ serves as a melter gasifier coolant and an oxidizer for the petroleum coke forming additional CO and maintaining a dome temperature of 1100° C. and a level of 85% and above of CO in the gasifier gases. The $CO_2$ reduces process oxygen consumption by about 8%, improving process economics. The $CO_2$ is an advantageous cooling gas for controlling the dome temperature of the melter gasifier and minimizing release of $CO_2$ to the atmosphere when using petroleum coke as a fuel. All or a portion of the reduction gas from the melter gasifier can alternatively be directed from the primary reduction furnace via line 46 to use as export gas or in a steam or power generator system 48. The power or steam may be exported as indicated in block 50.

Primary liquid iron production is accomplished in the reduction furnace 22 and melter-gasifier 20 using high grade iron ore, limestone, petroleum coke as a reductant and oxygen. A liquid iron is produced containing more than about 5% carbon and less than 0.5% and preferably about 0.3% silicon which is transferred continuously to an adjacent steel making reactor 54. Petroleum coke in combination with low silica iron ore enables desulfurizing of the liquid iron by lime addition only inside the melter-gasifier enabling removal of a basic sulfide slag at the transfer 56 between the gasifier and the steel making reactor 54. A dam in the liquid iron transfer continuously removes the calcium sulfide as a liquid slag for sale or disposal.

The steel making reactor 54, preferably similar to the energy optimizing furnace (EOF) of the type described in U.S. Pat. No. 4,946,498 to Ralph Weber, receives liquid iron directly from the melter-gasifier 20. The disclosure of this patent is incorporated herein for all purposes. Direct reduced iron (hot or cold) from the secondary reduction furnace 44 and/or preheated scrap may be also added to the steel making reactor 54 via feeder line 64. The preheated scrap is supplied from a source of scrap 58 which is shredded and fed to a scrap preheater and feeder 60. Hot offgas from the steel making reactor 54 via conduit 62 is used to preheat the scrap. Oxygen is supplied to the reactor 54 via conduit 66 to the molten iron bath at bottom, top or sides and will primary combust the silicon and carbon contained in solution in the liquid iron thus converting the iron to steel. Secondary oxygen supplied above the molten bath will complete the combustion of the silicon and carbon in the upper section of the reactor and in the offgas flue.

Liquid steel is tapped periodically from the bottom or side of the steel making reactor 54 to a ladle 68 and then transferred to a ladle station 68 for refining, additives and temperature control prior to casting. The refined molten steel can be continuously cast at casting station 70 into slabs or billets for subsequent processing to rolled steel products 72 such as hot strip or deep drawing wire. The steel making reactor is preferably rotated or tilted slightly to periodically remove the small amount of slag produced during steel making via conduit 74. The steel making slag will be discharged to a collection ladle for disposal.

The preferred embodiment of the present invention thus provides a method for making steel using a melter gasifier and a primary reduction furnace. The melter gasifier has a ferrous material charging entry, fuel charging entry, an oxygen entry, a lower molten metal and slag collection end and a reduction gas discharging port. Petroleum coke is introduced into the melter gasifier through the fuel charging entry and oxygen is blown into the melter gasifier through the oxygen entry. Petroleum coke is combusted in the melter gasifier to format least a first fluidized bed of coke particles from the petroleum coke and to form a hot flue gas. The hot flue gas is directed to the primary direct reduction furnace and contacted with high quality iron ore and limestone to produce direct reduced metallic iron and calcined limestone. The direct reduced metallic iron and the calcined limestone are introduced into the melter gasifier. The petroleum coke, oxygen, the direct reduced metallic iron and the calcined limestone are reacted at a temperature of at least 1050° C. in the melter gasifier to produce reduction gas and molten iron containing heavy metals freed from the combustion of the petroleum coke and a relatively small amount of calcium sulfide slag containing sulfur freed from the combustion of petroleum coke. The calcium sulfide slag is removed from the melter gasifier. The reduction gas is also removed from the melter gasifier and a portion of the reduction gas is flowed to the primary reduction furnace. Another portion of the reduction gas may be flowed to a secondary reduction furnace. The second portion of reduction gas is reacted with iron ore in the secondary direct reduction furnace to produce secondary direct reduced metallic iron. A steel making reactor is provided and molten iron from the melter gasifier and secondary reduced metallic iron from the secondary reduction furnace is introduced into the steel making reactor. Oxygen is blown into the steel making reactor and reacted with molten iron and secondary reduced metallic iron to form steel, off gas, and a steel making slag in the steel making reactor. The steel and steel making slag are separated and drawn from said steel making reactor.

Figure 2:
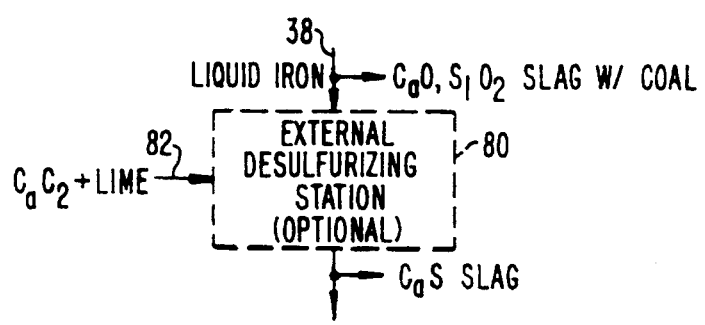
FIG. 2 is a partial flow diagram illustrating apparatus assembled in accordance with an alternative arrangement of the present invention.

While it is highly preferred to use petroleum coke as the reductant in the present invention, it is possible to use coal. If coal is used, it is desirable to select a coal with low ash content. Referring to FIG. 2 when coal is used, especially high ash coal, a separate desulfurizing vessel 80 is provided between the melter gasifier 20 and the steel making reactor 54. After calcium silicate is removed as indicated at 56, calcium carbide and lime are injected through conduit 82 into the vessel 80 and the resultant desulfurized slag is removed prior to transfer of the liquid iron to the steel making reactor 54. In ironmaking with coal or coke made from coal, the fuel has a content of 10% or more of ash inerts (basically shale or clay) which must be fluxed with limestone and disposed of as slag to remove from the system. Nominally this slag amounts to 500 pounds for each ton of liquid iron produced. Minimization of slag formation using petroleum coke is a very desirable economic feature.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention as defined in the following claims are expressly intended to be embraced thereby.

What is claimed is:

1. A method for making steel comprising providing a melter gasifier having a fuel charging entry, an oxygen entry, a lower molten metal and slag collection end, a reduction gas discharging port and means providing an entry for charging ferrous material into said melter gasifier; introducing petroleum coke into said melter gasifier through said fuel charging entry; introducing oxygen into said melter gasifier through said oxygen entry and combusting petroleum coke in said melter gasifier to format least a first fluidized bed of coke particles from said petroleum coke and a hot reducing gas; directing said hot reducing gas to a primary direct reduction furnace and contacting iron ore with said hot reducing gas in said first direct reduction furnace to produce direct reduced metallic iron; introducing the direct reduced metallic iron into said melter gasifier and reacting petroleum coke, oxygen and the direct reduced metallic iron in said melter gasifier to produce reduction gas and molten iron containing heavy metals freed from the combustion of the petroleum coke.; removing said reduction gas from said melter gasifier; directing a portion of said reduction gas to the primary reduction furnace; providing a steel making reactor; introducing molten iron directly from said melter gasifier into said steel making reactor; introducing oxygen into said steel making reactor and reacting the oxygen with molten iron and secondary reduced metallic iron to form steel, off gas, and a steel making slag in said steel making reactor; and drawing off steel and steel making slag from said steel making reactor.

2. The method of claim 1 further characterized in that the off gas from said steel making reactor is reacted with oxygen to preheat said scrap and the heated scrap is introduced into said steel making reactor for conversion into steel.

3. The method of claim 1 further characterized in that the molten iron from said melter gasifier is desulfurized prior to being introduced into said steel making reactor.

4. The method of claim 1, further characterized in that the silica content of said iron ore is less than about 2% by weight, resulting in substantially reducing the production of iron slag.

5. A method for making steel comprising providing a melter gasifier having a fuel charging entry, an oxygen entry, a lower molten metal and slag collection end, a reduction gas discharging port and means providing an entry for charging ferrous material into said melter gasifier; introducing petroleum coke into said melter gasifier through said fuel charging entry; introducing oxygen into said melter gasifier through said oxygen entry and combusting petroleum coke in said melter gasifier to format least a first fluidized bed of coke particles from said petroleum coke and to form a hot reducing gas; directing said hot reducing gas to a primary direct reduction furnace and contacting iron ore and limestone with said hot reducing gas in said first direct reduction furnace to produce direct reduced metallic iron and calcined limestone; introducing the direct reduced metallic iron and the calcined limestone into said melter gasifier and reacting, at a temperature of at least 1050° C., petroleum coke, oxygen, the direct reduced metallic iron and the calcined limestone in said melter gasifier to produce reduction gas and molten iron containing heavy metals freed from the combustion of the petroleum coke and a calcium sulfide slag containing sulfur freed from the combustion of petroleum coke; removing calcium sulfide slag from the melter gasifier; removing said reduction gas from said melter gasifier; directing a portion of said reduction gas to the primary reduction furnace; providing a secondary reduction furnace; directed another portion of said reduction gas to the secondary reduction furnace and combining the second portion of reduction gas with iron ore in the secondary direct reduction furnace to produce secondary direct reduced metallic iron; providing a steel making reactor; introducing molten iron from said melter gasifier and secondary reduced metallic iron from said secondary reduction furnace into said steel making reactor; introducing oxygen into said steel making reactor and reacting the oxygen with molten iron and secondary reduced metallic iron to form steel, off gas, and a steel making slag in said steel making reactor; separating steel and steel making slag and drawing off steel and steel making slag from said steel making reactor.

6. The method of claim 5 further characterized in that the off gas from said steel making reactor is reacted with oxygen to preheat said scrap and the heated scrap is introduced into said steel making reactor for conversion into steel.

7. The method of claim 5 further characterized in that the molten iron from said melter gasifier is desulfurized prior to being introduced into said steel making reactor.

8. The method of claim 5 further characterized in that the silica content of said iron ore is less than about 2% by weight.

* * * * *